US011763121B2

(12) United States Patent
Forster et al.

(10) Patent No.: US 11,763,121 B2
(45) Date of Patent: Sep. 19, 2023

(54) SHIELDED RFID TAGS FOR INCORPORATION INTO MICROWAVABLE FOOD PACKAGING

(71) Applicant: Avery Dennison Retail Information Services, LLC, Mentor, OH (US)

(72) Inventors: Ian J. Forster, Chelmsford (GB); Norman A. Howard, Ilford (GB); Edward J. McGinniss, Clinton, SC (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 16/389,296

(22) Filed: Apr. 19, 2019

(65) Prior Publication Data

US 2019/0325282 A1 Oct. 24, 2019

Related U.S. Application Data

(60) Provisional application No. 62/660,536, filed on Apr. 20, 2018.

(51) Int. Cl.
G06K 19/07 (2006.01)
G06K 19/077 (2006.01)

(52) U.S. Cl.
CPC ... G06K 19/0723 (2013.01); G06K 19/07775 (2013.01)

(58) Field of Classification Search
None
See application file for complete search history.

(56) References Cited

U.S. PATENT DOCUMENTS

D383,465 S 9/1997 Chen
6,142,381 A 11/2000 Finn et al.
(Continued)

FOREIGN PATENT DOCUMENTS

CN 102119395 7/2011
CN 104541316 4/2015
(Continued)

OTHER PUBLICATIONS

International Preliminary Report on Patentability dated Oct. 20, 2020 issued in corresponding IA No. PCT/US2019/028281 filed Apr. 19, 2019.
(Continued)

*Primary Examiner* — Thien M Le
*Assistant Examiner* — April A Taylor

(57) ABSTRACT

RFID tags are provided for incorporation into the packaging of a microwavable food item, with the RFID tag being configured to be safely microwaved. The RFID tag includes a substrate having opposing first and second surfaces. An antenna is secured to the first surface, with the antenna defining a gap and being configured to operate at a first frequency. An RFID chip is electrically coupled to the antenna across the gap. A shielding structure is secured to the second surface of the substrate, with at least a portion of the shielding structure being in substantial alignment with the gap. The shielding structure is configured to limit the voltage across the gap when the antenna is exposed to a second frequency that is greater than first frequency. Also provided are methods for manufacturing RFID tags from a web in which conductive layers are secured to opposing surfaces of a substrate.

18 Claims, 2 Drawing Sheets

(56) References Cited

U.S. PATENT DOCUMENTS

| | | |
|---|---|---|
| 6,924,688 B1 | 8/2005 | Beigel |
| 7,214,569 B2 | 5/2007 | Swindlehurst et al. |
| D546,819 S | 7/2007 | Oliver |
| D553,124 S | 10/2007 | Joughin et al. |
| 7,471,173 B2 | 12/2008 | Hidaka et al. |
| 7,500,610 B1 | 3/2009 | Hadley |
| 7,535,366 B2 | 5/2009 | Egbert |
| D634,738 S | 3/2011 | Lim et al. |
| 8,179,329 B2 | 5/2012 | Kato |
| 8,289,165 B2 | 10/2012 | Forster |
| 8,473,235 B2 | 6/2013 | Kittel et al. |
| 8,511,569 B1 | 8/2013 | Koepp et al. |
| D697,900 S | 1/2014 | Yang et al. |
| D716,774 S | 11/2014 | Forster et al. |
| 9,070,563 B2 | 6/2015 | Yamazaki et al. |
| 9,378,451 B2 | 6/2016 | Forster |
| 9,418,262 B1 | 8/2016 | Gentile et al. |
| 9,595,211 B2 | 3/2017 | Lim et al. |
| D809,489 S | 2/2018 | Burkholder et al. |
| D812,045 S | 3/2018 | Howard |
| D826,220 S | 8/2018 | He |
| D837,769 S | 1/2019 | Yang |
| 10,186,765 B2 * | 1/2019 | Coleman .......... G06K 19/07728 |
| 10,243,255 B2 | 3/2019 | Rokhsaz et al. |
| 10,268,945 B1 | 4/2019 | Keller et al. |
| 10,311,355 B1 | 6/2019 | Hahn et al. |
| D855,039 S | 7/2019 | Naweed |
| D880,460 S | 4/2020 | Forster |
| 10,665,922 B2 | 5/2020 | Takahashi et al. |
| 10,846,585 B1 | 11/2020 | Keller et al. |
| 2002/0157411 A1 | 10/2002 | Ishikawa et al. |
| 2004/0089707 A1 | 5/2004 | de Cortina et al. |
| 2004/0238534 A1 | 12/2004 | Mast |
| 2005/0001785 A1 | 1/2005 | Ferguson et al. |
| 2005/0091996 A1 | 5/2005 | Ishikawa et al. |
| 2006/0043198 A1 | 3/2006 | Forster |
| 2006/0044192 A1 | 3/2006 | Egbert |
| 2006/0054710 A1 | 3/2006 | Forster et al. |
| 2006/0145872 A1 | 7/2006 | Tanaka |
| 2007/0063057 A1 | 3/2007 | Masubuchi et al. |
| 2007/0069859 A1 | 3/2007 | Bae et al. |
| 2007/0132593 A1 | 6/2007 | Yamazaki |
| 2007/0164859 A1 | 7/2007 | Cobianu et al. |
| 2007/0171129 A1 * | 7/2007 | Coleman ................ H05K 3/046 343/700 MS |
| 2007/0194935 A1 | 8/2007 | Ayala et al. |
| 2007/0238245 A1 | 10/2007 | Cote et al. |
| 2008/0105673 A1 | 5/2008 | Ikeda et al. |
| 2008/0122631 A1 | 5/2008 | Kodukula et al. |
| 2008/0143480 A1 | 6/2008 | Egbert et al. |
| 2008/0220721 A1 | 9/2008 | Downie et al. |
| 2009/0109002 A1 | 4/2009 | Hadley et al. |
| 2009/0179817 A1 | 7/2009 | Yin |
| 2009/0236334 A1 | 9/2009 | Ben-Shmuel et al. |
| 2009/0309703 A1 | 12/2009 | Forster |
| 2010/0000980 A1 | 1/2010 | Popescu |
| 2010/0001079 A1 | 1/2010 | Martin et al. |
| 2010/0117819 A1 | 5/2010 | Murray |
| 2010/0141452 A1 | 6/2010 | Lian et al. |
| 2010/0213187 A1 | 8/2010 | Bandholz et al. |
| 2010/0302013 A1 | 12/2010 | Kato et al. |
| 2011/0025466 A1 | 2/2011 | Stone |
| 2011/0133904 A1 | 6/2011 | Warther |
| 2011/0147467 A1 | 6/2011 | Choi |
| 2011/0253975 A1 | 10/2011 | Shatalov et al. |
| 2012/0061473 A1 * | 3/2012 | Forster ................ B23K 26/364 235/492 |
| 2012/0062367 A1 | 3/2012 | Warther |
| 2012/0111950 A1 | 5/2012 | Worrall et al. |
| 2013/0002404 A1 | 1/2013 | Takeoka et al. |
| 2013/0087625 A1 | 4/2013 | Kato |
| 2013/0299583 A1 | 11/2013 | Wilkinson |
| 2013/0306626 A1 | 11/2013 | Torres et al. |
| 2013/0313328 A1 | 11/2013 | Mohajer-Iravani et al. |
| 2014/0034739 A1 * | 2/2014 | Forster ............ G06K 19/07786 235/492 |
| 2015/0076238 A1 | 3/2015 | Koskelainen |
| 2015/0144702 A1 | 5/2015 | Mei et al. |
| 2016/0003895 A1 | 1/2016 | Farr et al. |
| 2016/0345389 A1 | 11/2016 | Torres et al. |
| 2017/0214142 A1 | 8/2017 | Rokhsaz et al. |
| 2018/0092486 A1 | 4/2018 | Kwon et al. |
| 2018/0189623 A1 * | 7/2018 | Forster ............ G06K 19/07771 |
| 2019/0325282 A1 | 10/2019 | Forster et al. |
| 2020/0005110 A1 | 1/2020 | Forster |
| 2020/0160005 A1 | 5/2020 | Volpi et al. |

FOREIGN PATENT DOCUMENTS

| | | |
|---|---|---|
| CN | 208423178 U | 1/2019 |
| CN | 109389203 | 2/2019 |
| DE | 102008054711 | 6/2009 |
| EP | 1174667 | 1/2002 |
| EP | 1479619 | 11/2004 |
| EP | 2306588 | 4/2011 |
| EP | 3828771 | 6/2021 |
| GB | 2554952 | 4/2018 |
| JP | 2001-317741 | 11/2001 |
| JP | 2002-150248 | 5/2002 |
| JP | 2003-030612 | 1/2003 |
| JP | 2003-087044 | 3/2003 |
| JP | 2005-101987 | 4/2005 |
| JP | 2005-216044 | 8/2005 |
| JP | 2005-252853 | 9/2005 |
| JP | 2005-323019 | 11/2005 |
| JP | 2006-132793 | 5/2006 |
| JP | 2007-086863 | 4/2007 |
| JP | 2007-089054 | 4/2007 |
| JP | 2010-045467 | 2/2010 |
| JP | 2010-212853 | 9/2010 |
| JP | 2010-231797 | 10/2010 |
| JP | 2010-263404 | 11/2010 |
| JP | 2011-100181 | 5/2011 |
| JP | 2011-227668 A | 11/2011 |
| JP | 2014-003452 | 1/2014 |
| JP | 2016-532901 A | 10/2016 |
| JP | 2018-163643 | 10/2018 |
| WO | 2002/099764 | 12/2002 |
| WO | 2006/048964 | 11/2006 |
| WO | 2008/084917 | 7/2008 |
| WO | 2009/110381 | 9/2009 |
| WO | 2010/079830 | 7/2010 |
| WO | 2011/159716 | 12/2011 |
| WO | 2014/210000 | 12/2014 |
| WO | 2017/094794 | 6/2017 |
| WO | 2017/126418 | 7/2017 |
| WO | 2018/125977 | 7/2018 |
| WO | 2019/046429 | 3/2019 |

OTHER PUBLICATIONS

International Search Report and Written Opinion dated Aug. 5, 2019 issued in corresponding IA No. PCT/US2019/028281 fiied Apr. 19, 2019.

International Preliminary Report on Patentability dated Jul. 11, 2019 issued in corresponding IA No. PCT/US2017/068659 filed Dec. 28, 2017.

International Search Report and Written Opinion dated Oct. 1, 2019 issued in corresponding IA No. PCT/US2019/039485 filed Jun. 27, 2019.

International Search Report and Written Opinion dated Oct. 11, 2019 issued in corresponding IA No. PCT/US2019/039460 filed Jun. 27, 2019.

International Search Report and Written Opinion dated Jun. 8, 2018 issued in corresponding IA No. PCT/US2017/068659 filed Dec. 28, 2017.

International Preliminary Report on Patentability dated Oct. 29, 2020 Issued in corresponding IA No. PCT/US2019/028275 filed Apr. 19, 2019.

(56) References Cited

OTHER PUBLICATIONS

International Search Report and Written Opinion dated Jul. 12, 2019 issued in corresponding IA No. PCT/US2019/028275 filed Apr. 19, 2019.
International Search Report and Written Opinion dated Sep. 10, 2019 issued in corresponding IA No. PCT/US2019/028268 filed Apr. 19, 2019.
International Preliminary Report on Patentability dated Oct. 29, 2020 issued in corresponding IA No. PCT/US2019/028268 filed Apr. 19, 2019.
International Search Report and Written Opinion dated Mar. 31, 2021 issued in corresponding IA No. PCT/US2020/067168 filed Dec. 28, 2020.
International Search Report and Written Opinion dated Mar. 30, 2021 issued in corresponding IA No. PCT/US2020/067115 filed Dec. 28, 2020.
International Preliminary Report on Patentability dated Dec. 29, 2020 issued in corresponding IA No. PCT/US2019/039485 filed Jun. 27, 2019.
International Preliminary Report on Patentability dated Dec. 29, 2020 issued in corresponding IA No. PCT/US2019/039460 filed Jun. 27, 2019.
International Preliminary Report on Patentability dated Jul. 5, 2022 issued in corresponding IA No. PCT/US2020/067115 filed Dec. 28, 2020.
International Preliminary Report on Patentability dated Jun. 28, 2022 issued in corresponding IA No. PCT/US2020/067168 filed Dec. 28, 2020.

\* cited by examiner

SHIELDED RFID TAGS FOR INCORPORATION INTO MICROWAVABLE FOOD PACKAGING

CROSS REFERENCE TO RELATED APPLICATION(S)

The present application claims priority to and the benefit of U.S. provisional utility patent application No. 62/660,536 filed on Apr. 19, 2018, which is incorporated by reference herein in its entirety.

FIELD OF THE DISCLOSURE

The present subject matter relates to packaging for microwavable food items. More particularly, the present subject matter relates to radio frequency identification ("RFID") tags incorporated into packaging for microwavable food items.

DESCRIPTION OF RELATED ART

It is known for packages for microwavable food items to include cooking aids that are to be placed into the microwave oven with the food item for cooking/heating the food item. For example, foods having crusts, such as frozen pies or stuffed bread, may benefit from "crisping sleeves," which are paper items that at least partially surround the food item during microwaving. Typically, a "crisping sleeve" has a paper substrate, with a susceptor incorporated into the inner surface of the "crisping sleeve," facing and preferably in contact with the food item. The susceptor, which may be a metallized film, absorbs microwave energy and converts it into heat, which crisps and/or browns the crust or surface of the food item, thus improving the look and texture of the food item. Due to the absorbing nature of the film used as the susceptor, relatively low levels of energy are reflected by it, such that it does not strike an arc due to generating high differential voltages between adjacent parts of the film, which could otherwise cause the packaging to catch fire.

It is also known to incorporate RFID technology, such as an RFID tag, into product packaging for various purposes, including inventory management and theft prevention. FIG. 1 shows an RFID tag "T" according to conventional design, which may be secured to or otherwise associated with the enclosure (typically, a paper or cardboard sleeve or box) of packaging for a microwavable food item. The entirety of the packaging is not intended to be microwaved, but rather the food item (and, optionally, a "crisping sleeve" or the like) is removed from the enclosure and inserted into the microwave oven for heating/cooking.

The RFID tag "T" includes an RFID chip "C", with an associated dipole antenna "A" for transmitting information to and/or receiving information from an RFID reader (not illustrated). The RFID chip "C" is electrically coupled to the antenna "A" across a gap "G" defined by the antenna "A" between two conductor pad areas "P". RFID tags inherently must, at some point, have a gap across which the RFID chip is placed that has a voltage at the intended frequency of operation when in the field of a reader device. The power required incident on the RFID chip "C" may be as low as 10 microwatts, whereas a microwave oven may typically operate at a power level in excess of 800 watts, which can generate very high voltages across the gap "G" and the associated RFID chip "C".

The antenna "A" is designed to operate at a first frequency F1, for example in the range of approximately 860 MHz to 930 MHz, with the antenna "A" taking incident power at the first frequency F1 from an RFID reader and converting it to a voltage across the RFID chip "C" to allow it to operate.

A second frequency applied by the microwave oven, identified in FIG. 1 at F2, typically on the order of approximately 2,450 MHz, may also be incident on the antenna "A" when the RFID tag "T" is placed into the microwave oven. The antenna "A" is not designed to operate at the second frequency F2, as the very high power levels incident at second frequency F2 will generate high voltages on the antenna "A". These high voltages can appear at a number of places on the antenna "A"; however, by methods such as introducing large gaps "L" between antenna elements and controlled radii (identified generally at "R" in FIG. 1), a voltage across said elements that would generate a high voltage breakdown and, hence, arc can be avoided. However, the gap "G" bridged by the RFID chip "C" is necessarily relatively small and, hence, a high voltage arises at the second frequency F2, which high voltage may cause a breakdown and generate an arc.

To avoid problems of this nature, the RFID tag "T" is typically configured to be readily removable or otherwise dissociable from the food item, such as by securing it to the enclosure of the package, which may include instructions to not microwave the enclosure. However, it is possible that a user failing to take proper care could place the entire package (including the RFID tag "T") into the microwave oven with the food item, thereby failing to dissociate the RFID tag "T" from the food item.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, the disclosure addresses problems of previous RFID tagged packaging for microwavable food items and other items by providing an RFID tag that may be microwaved without resulting in the problems associated with microwaving a conventional RFID tag "T" by approaches and structures disclosed herein.

In a further aspect, an RFID tag includes substrate having opposing first and second surfaces. An antenna is secured to the first surface, defines a gap, and is configured to operate at a first frequency. An RFID chip is electrically coupled to the antenna across the gap. A shielding structure is secured to the second surface of the substrate, with at least a portion of the shielding structure being in substantial alignment with the gap. The shielding structure is configured to limit the voltage across the gap when the antenna is exposed to a second frequency that is greater than the first frequency.

In some embodiments, the antenna of the RFID tag is no larger than 40 mm in the maximum dimension. In some embodiments, a center of the shielding structure is substantially aligned with the RFID chip. In some embodiments, the shielding structure is larger than the gap. In some embodiments, the shielding structure is electrically coupled to the antenna through the substrate. In some embodiments, the RFID tag further includes first and second conductive bridges that extend between the antenna and the shielding structure through the substrate so that the first and second conductive bridges are associated with the antenna at opposing sides of the gap. In some embodiments, the first and second conductive bridges are substantially identical. In some embodiments, the first and second conductive bridges are substantially equally spaced from the gap. In some embodiments, each of the first and second conductive bridges is positioned closer to an associated edge of the shielding structure than to the gap. In some embodiments, each of the first and second conductive bridges comprises an electro-chemically formed via. In some embodiments, each of the first and second conductive bridges comprise a crimp. In some embodiments, each of the first and second conductive bridges comprise conductive ink(s) received by a respective hole defined in the substrate.

In another aspect, a method of manufacturing an RFID tag includes providing a web comprising a substrate having opposing first and second surfaces, with a first conductive layer secured to the first surface and a second conductive layer secured to the second surface. At least a portion of the first conductive layer is formed into an antenna defining gap and configured to operate at a first frequency. At least a portion of the second conductive layer is formed into a shielding structure, with at least a portion of the shielding structure being in substantial alignment with the gap. The shielding structure is configured to limit the voltage across the gap when the antenna is exposed to a second frequency that is greater than the first frequency. An RFID chip is electrically coupled to the antenna across the gap.

In some embodiments, one or both of the antenna and shielding structure can be formed via die-cutting. In some embodiments, one or both of the antenna and shielding structure can be formed via laser-cutting. In another embodiment, one or both of the antenna and shielding can be formed via die-cutting and laser-cutting. In some embodiments, the step of forming at least a portion of the first conductive layer into an antenna occurs substantially simultaneously with the step of forming at least a portion of the second conductive layer into a shielding structure. In other embodiments, the steps of forming at least a portion of the first conductive layer into an antenna structure and the step of forming at least a portion of the second conductive layer into a shielding structure occur sequentially. In some embodiments, a method of manufacturing an RFID tag further includes reversing an orientation of the web between the step of forming at least a portion of the first conductive layer into an antenna and the step of forming at least a portion of the second conductive layer into a shielding structure. In some embodiments either the antenna or the shielding structure is formed during a first pass through a forming system, and the other of the antenna or the shielding structure is formed during a second pass through the forming structure. In some embodiments, the method of forming an RFID tag further includes electrically coupling the shielding structure to the antenna through the substrate.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 2:
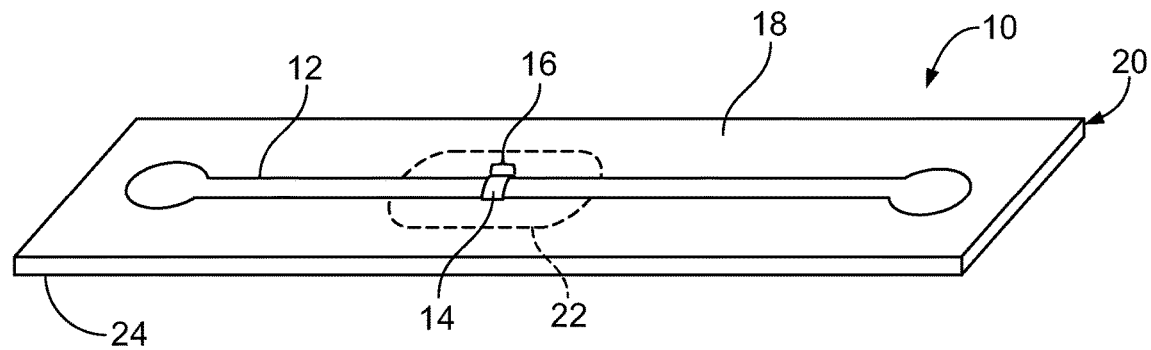
FIG. 2 is a top perspective view of an exemplary RFID tag according to aspects of the present disclosure, which may be incorporated into packaging for a microwavable food or other item.

FIG. 2 shows an RFID tag 10 according to an aspect of the present disclosure, which RFID tag 10 may be secured to the enclosure (e.g., a paper box) of packaging for a microwavable food item or other item able to be and/or intended to be microwaved. RFID tag may be secured to any suitable location of the enclosure of packaging, for example, an outer surface of the packing or an inner surface of the packaging. Although herein the term "food item" typically is referenced, it is to be understood to encompass microwavable non-food items as well. The packaging may include other items, such as a "crisping sleeve" configured to be microwaved with the food item. While the RFID tag 10 is preferably secured to the enclosure, it is also within the scope of the present disclosure for the RFID tag 10 to be associated with another portion of the packaging. For example, the RFID tag 10 may be secured to a "crisping sleeve" or to other portions of the packaging, such as a food tray or dish in which the microwaveable food is placed for microwaving. Further, while RFID tags are described herein as being incorporated into the packaging of a microwavable food item, it should be understood that RFID tags according to the present disclosure may be useful in any of a number of possible applications, particularly when it is contemplated that they may be exposed to frequencies (referred to herein as a "second frequency") that are significantly higher than the frequency (referred to herein as a "first frequency") at which an antenna of the RFID tag is intended to operate.

Figure 1:
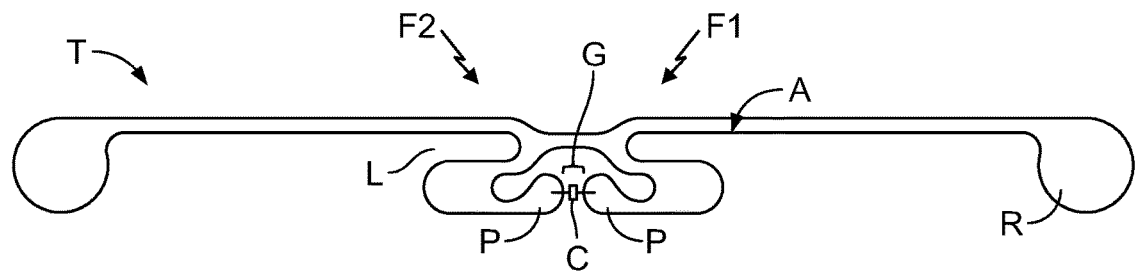
FIG. 1 is a top plan view of an RFID tag according to conventional design.

The RFID tag 10 includes an antenna 12 with an RFID chip 14 electrically coupled thereto. The antenna 12 is provided as a dipole antenna, which is formed of a conductor defining a gap 16 between two conductor pad areas, which is bridged by the RFID chip 14. The antenna 12 and RFID chip 14 may be provided generally according to conventional design (e.g., as described above with respect to the embodiment of FIG. 1), with the antenna 12 being designed to operate at a first frequency, which may be in the range of approximately 860 MHz to 930 MHz. As in the conventional RFID tag "T", the antenna 12 takes incident power at the first frequency and converts it to a voltage across the RFID chip 14 to allow the RFID chip 14 to operate, as is known to a person of ordinary skill in the art.

The RFID chip 14 may take any of a number of forms (including those of the type commonly referred to as a "chip" or a "strap" by one of ordinary skill in the art), including any of a number of possible components and being configured to perform any of a number of possible functions.

For example, the RFID chip 14 includes an integrated circuit for controlling RF communication and other functions of the RFID tag 10.

The antenna 12 is mounted or secured to a first surface 18 of a substrate 20, with the substrate 20 being formed of a non-conductive material, such as a paper, plastic, or fabric material. A shielding structure 22 is mounted or secured to an opposing second surface 24 of the substrate 20. The shielding structure 22 is formed of a material having conductive properties and may be variously configured without departing from the scope of the present disclosure. For example, in one embodiment, the shielding structure 22 is generally flat or planar, with a generally ovoid perimeter, but in other embodiments, the shielding structure 22 may be non-planar and/or have a differently shaped perimeter. It may be advantageous for the shielding structure 22 to be formed of a non-flammable material, such as an aluminum material, to provide a barrier to any arc that may be generated across the gap 16 and prevent a fire from spreading.

Regardless of the particular configuration of the shielding structure 22, at least a portion of it is in substantial alignment with the gap 16 of the antenna 12. For example, as shown in FIG. 2, the center of the shielding structure 22 may be positioned at substantially the same location on the second surface 24 of the substrate 20 as the RFID chip 14 on the first surface 18 of the substrate 20. Stated differently, in the orientation of FIG. 2, the center of the shielding structure 22 is positioned directly below the RFID chip 14, with the substrate 20 positioned therebetween. While it may be advantageous for the center of the gap 16 (which may coincide with the position of the RFID chip 14) to be in substantial alignment with the center of the shielding structure 22, it is also within the scope of the present disclosure for their centers to be out of alignment.

Preferably, the shielding structure 22 is larger than the gap 16, such that a portion of the shielding structure 22 is provided in exact alignment with the gap 16, with the perimeter of the shielding structure 22 extending outwardly of the bounds of the gap 16, as in the embodiment of FIG. 2. This extended area, if provided, assists in dissipating heat generated across the gap 16 when the RFID tag 10 is exposed to a signal operating at the second frequency, which effect is enhanced by increasing the size of the extended area. Thus, it may be advantageous for the shielding structure 22 to be relatively large (compared to the size of the gap 16) for improved heat dissipation. In some embodiments, the shielding structure 22 has an area that is at least twice as large as an area of the gap 16. In some embodiments, the area of the shielding structure 22 is approximately five to ten times as large as an area of the gap 16. In other embodiments, the area of the shielding structure 22 is greater than ten times as large as the area of the gap 16.

In addition to providing improved heat dissipation, a relatively large shielding structure 22 (compared to the size of the gap 16) advantageously increases manufacturing tolerances, resulting in increased efficiency and decreased manufacturing costs. For example, a greater manufacturing tolerance is realized when the shielding structure 22 is relatively large compared to the size of the gap 16 because even minor variances in placement or location of the shielding structure 22 can still result in an assembly in which a portion of the shielding structure 22 is in substantial alignment with the gap. Thus, as the relative size of the shielding structure 22 compared to the gap 16 increases, so too do manufacturing tolerances.

As described above, it is possible for the RFID tag 10 to be exposed to signals operating at first or second frequencies, with the tendency for a large voltage to arise across the gap 16 when the RFID tag 10 is exposed to the elevated second frequency, which risks the creation of an arc. If the voltage and power at the second frequency are limited sufficiently, the RFID chip 14 may survive, but the main objective is to prevent an arc that could ignite the RFID tag 10 or the packaging into which it is incorporated. The shielding structure 22 provides this function by "shorting" the high voltage generated across the gap 16 (and, hence, the RFID chip 14) when the RFID tag 10 is exposed to the second frequency, thereby reducing the voltage below the level that can cause a breakdown and possible arc, which prevents ignition. Accordingly, the RFID tag 10 may be placed into a microwave and exposed to the attendant high-frequency signals (which may be on the order of approximately 2,450 MHz) without the risk of ignition, unlike a conventional RFID tag T.

As for the first frequency, when the RFID tag 10 is exposed to it, the shielding structure 22 forms a partial short circuit across the gap 16, but the antenna 12 is preferably configured so as to compensate for the presence of the partial short circuit, thereby allowing the RFID tag 10 to operate properly.

Differently configured RFID tags incorporating shielding structures are described in U.S. patent application Ser. No. 15/856,502. While such configurations are suitable for RFID tags having larger antennae, configurations according to the present disclosure may be advantageous for an RFID tag having a smaller antenna, such as an antenna that is too small for a strap with an integrated shielding structure or for a separately applied shielding structure. A smaller antenna requires greater accuracy when associating the shielding structure, and the shielding structure may be more accurately positioned when employing double-sided, etched substrates of the type described herein. Thus, while the principles of the present disclosure may be employed in RFID tags of any size, they may be of particular utility when employed with an RFID tag having a relatively small antenna, such as an antenna being no larger than 40 mm in the maximum dimension.

Figure 3:
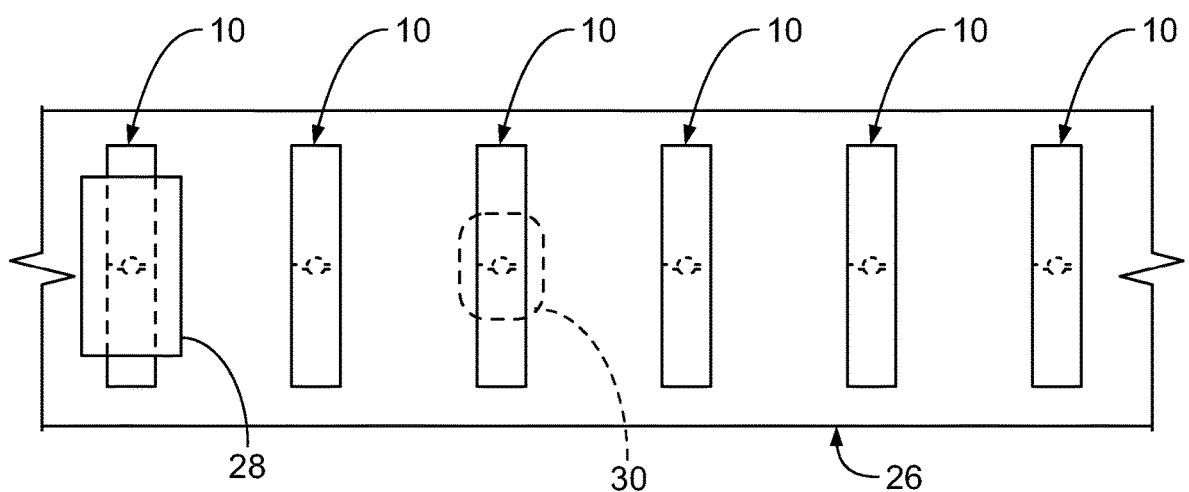
FIG. 3 is a top plan view of a web of material that may be used to form RFID tags according to the present disclosure, along with components of an exemplary forming system for manufacturing such RFID tags.

RFID tags according to the present disclosure may be manufactured according to any suitable approach. In one embodiment, which is illustrated in FIG. 3, a flexible web of material (generally identified at 26) is used to manufacture a plurality of RFID tags 10. The web 26 comprises a substrate 20 including opposing first surface 18 and second surface 24, with a first conductive layer secured to the first surface and a second conductive layer secured to the second surface. The conductive layers may be applied to the substrate 20 according to any suitable approach, which may include the conductive layers being printed or otherwise deposited onto the opposing surfaces 18, 24 of the substrate 20.

The web 26 is advanced through a forming system, which processes the first conductive layer to define an antenna 12 and processes the second conductive layer to define a shielding structure 22. The conductive layers may be applied to the substrate 20 before the web 26 is introduced to the forming system or, in another embodiment, the forming system may be used to both apply the conductive layers to the substrate 20 and then process the conductive layers.

In one embodiment, the forming system includes a pair of forming or processing stations (one identified in FIG. 3 at 28 and the other identified in FIG. 3 at 30). The first forming station 28 functions to process the first conductive layer to define an antenna 12, while the second forming station 30 functions to process the second conductive layer to define a shielding structure 22. The forming stations 28 and 30 may be variously configured without departing from the scope of the present disclosure. For example, in one exemplary embodiment, one or both of the forming stations 28 and 30 is configured as a laser to process the associated conductive layer via laser-cutting. In another exemplary embodiment, one or both of the forming stations 28 and 30 is configured as a die to process the associated conductive layer via die-cutting.

The forming stations 28 and 30 may be positioned opposite each other and in facing relationship, with the web 26 positioned therebetween. In such an embodiment, the forming stations 28 and 30 function to simultaneously process the first conductive layer into an antenna 12 and to process the second conductive layer into a shielding structure 22. Alternatively, rather than such aligned forming stations 28 and 30 processing the associated conductive layers simultaneously, it is also within the scope of the present disclosure for them to process the associated conductive layers sequentially.

In another embodiment, which is illustrated in FIG. 3, the forming stations 28 and 30 are staggered or spaced apart in the direction of travel of the web 26 through the forming system, with the forming stations 28 and 30 being positioned on opposing sides of the web 26 and in facing relationship, but not directly opposite each other. In such an embodiment, the first and second conductive layers of a given RFID tag 10 are processed sequentially, rather than being processed simultaneously. Instead, the first conductive layer of one RFID tag 10 may be processed simultaneously with the second conductive layer of another RFID tag 10. The forming stations 28 and 30 may be processed with either upstream of the other, such that either the antenna 12 may be formed first (which is the case if the web 26 moves left-to-right in the orientation of FIG. 3) or the shielding structure 22 may be formed first (which is the case if the web 26 moves right-to-left in the orientation of FIG. 3).

Alternatively, rather than the forming stations 28 and 30 being positioned on opposite sides of the web 26, the forming stations 28 and 30 may be positioned on the same side of the web 26 and staggered or spaced apart in the direction of travel of the web 26 through the forming system. In such an embodiment, the orientation of the web 26 is reversed by the forming system, such that one of the first surface 18 or second surface 24 of the substrate 20 faces the respective forming stations 28 or 30 initially, followed by the other surface 18, 24 facing the forming stations 28, 30 following the reversal of orientation. The conductive layer of the surface 18, 24 initially facing the forming station 28, 30 is processed by the upstream forming station 28, 30, followed by the orientation of the web 26 being reversed (e.g., using a turn bar). Following the reversal of orientation, the other conductive layer (now facing the forming station 28 or 30) is processed by the downstream forming station 28, 30.

In yet another embodiment, rather than the forming system including a pair of forming stations 28 and 30, the forming system may instead be provided with a single forming station (not illustrated). In such an embodiment, the web 26 may make either one or two passes through the forming system. If making one pass, the forming station may be used to process one of the conductive layers, followed by the orientation of the web 26 being reversed. Following the reversal or orientation, the web 26 may be passed across the single forming station a second time to process the other conductive layer. On the other hand, if making two passes, the forming station is used to process one of the conductive layers during a first pass. The partially processed web 26 is then removed from the forming system, followed by its orientation being reversed before being reintroduced to the forming system for a second pass. During the second pass, the forming station processes the other conductive layer.

In some embodiments, a forming system has a plurality of forming stations. For example, a forming system may have a plurality of first forming stations 28 and a plurality of second forming stations 30. In other embodiments, a forming system has a plurality of single forming stations. By including a plurality of first and second forming stations 28, 30, or single forming stations, multiple forming processes can be accomplished simultaneously. For example, in a forming system having a plurality of first and second forming stations 28, 30, multiple antennae 12 and/or shielding structures 22 can be formed on a web substantially simultaneously. Use of a plurality of forming stations can advantageously increase the rate of processing the conductive layers of the web 26.

After the conductive layers of the web 26 have been processed, additional processing may be carried out on the web 26 to form the individual RFID tags 10. This may include electrically coupling an RFID chip to the antenna and cutting, punching, or otherwise forming and removing the individual RFID tags 10 from the web 26.

Figure 4A:
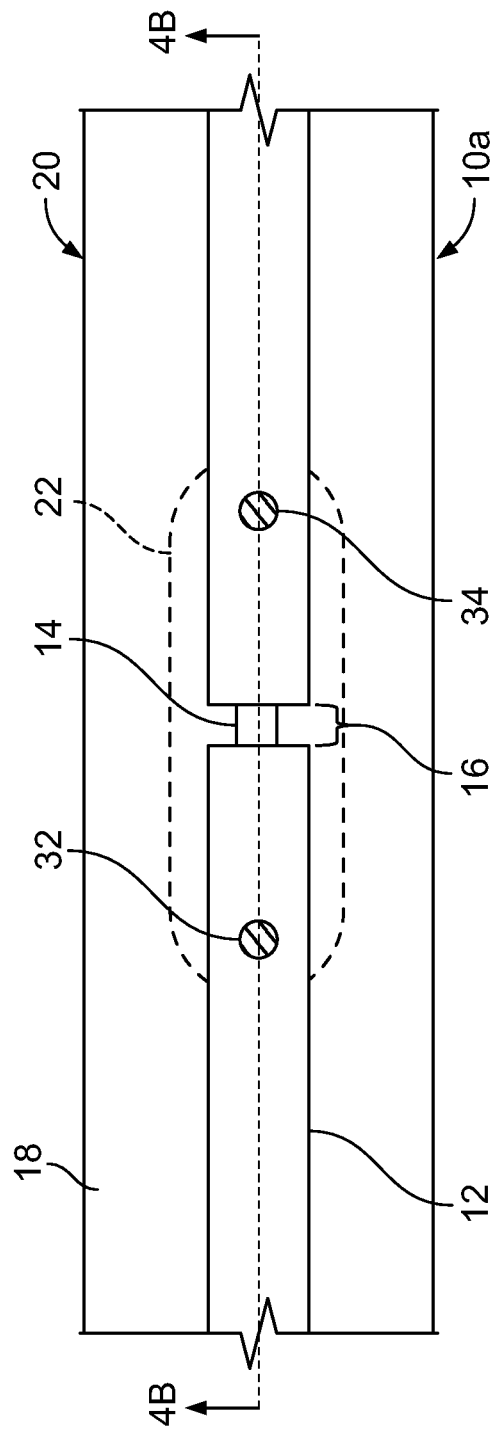
FIG. 4A is a top plan view of another embodiment of an RFID tag according to aspects of the present disclosure, which may be incorporated into packaging for a microwavable food or other item.
Figure 4B:
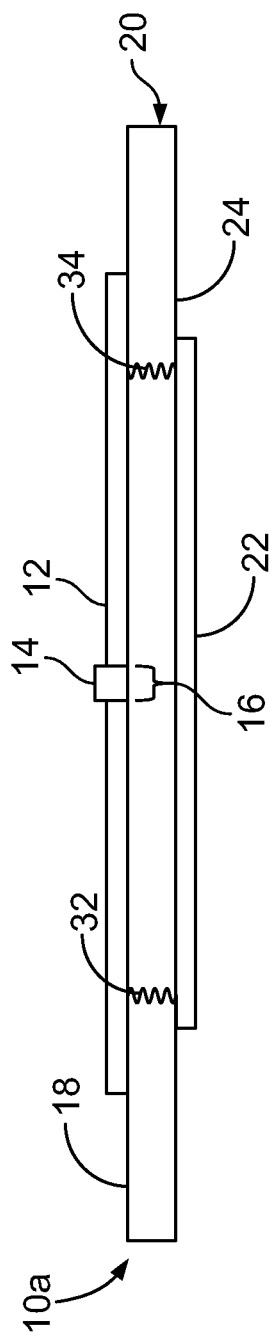
FIG. 4B is a cross-sectional view of a portion of the RFID tag of FIG. 4A, taken through the line 4B-4B of FIG. 4A.

It should be understood that the RFID tag 10 of FIG. 2 is merely exemplary, and that RFID tags according to the present disclosure may be differently configured. For example, rather than the shielding structure 22 being entirely separate from the antenna 12, an RFID tag 10a may include a shielding structure 22 that is electrically coupled to the antenna 12, as shown in FIGS. 4A and 4B. In the illustrated embodiment, the shielding structure 22 is electrically coupled to the antenna 12 through the substrate 20, with a first conductive bridge 32 extending between the shielding structure 22 and the antenna 12 on one side of the gap 16 and a second conductive bridge 34 extending between the shielding structure 22 and the antenna 12 on the opposite side of the gap 16. By electrically coupling the shielding structure 22 and the antenna 12, the shielding structure 22 not only acts to prevent formation of an arc across the gap 16, but also acts as a tuning inductor across the RFID chip 14.

In the illustrated embodiment, the first and second conductive bridges 32 and 34 are substantially identical, substantially parallel, and at least substantially equally spaced from the gap 16. However, in other embodiments, the conductive bridges 32 and 34 may be differently configured, non-parallel, and/or differently spaced from the gap 16. Additionally, in the illustrated embodiment, the conductive bridges 32 and 34 are positioned closer to an associated edge of the shielding structure 22 than to the gap 16, but it is also within the scope of the present disclosure for one or both of the conductive bridges 32 and 34 to be positioned closer to the gap 16 than to an associated edge of the shielding structure 22. Although providing a minimal number of conductive bridges, such as two as shown in FIGS. 4A and 4B, can advantageously provide for cheaper and more efficient manufacturing of RFID tags 10a, any number of conductive bridges can be used as may be required or desired for a particular RFID tag 10a design.

Regardless of the particular configurations of the first and second conductive bridges 32 and 34, they may be formed according to any suitable approach. In one embodiment, each of the first and second conductive bridges 32 and 34 comprises an electro-chemically formed via. In another embodiment, each of the first and second conductive bridges 32 and 34 comprises a crimp. In yet another embodiment, each of the first and second conductive bridges 32 and 34 comprises conductive ink received by a respective hole or aperture or opening defined in the substrate 20. Other configurations may also be employed without departing from the scope of the present disclosure.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. An RFID tag comprising:
    a substrate including opposing first and second surfaces;
    a dipole antenna secured to the first surface of the substrate, defining a gap, and configured to operate at a first frequency;
    an RFID chip electrically coupled to the antenna across the gap;
    a shielding structure secured to the second surface of the substrate with at least a portion of the shielding structure in substantial alignment with the gap, wherein the shielding structure is configured to limit the voltage across the gap when the antenna is exposed to a second frequency greater than the first frequency; and
    first and second conductive bridges extending between the antenna and the shielding structure through the substrate to prevent formation of an arc across the gap, wherein the first and second conductive bridges are associated with the antenna at opposing sides of the gap.

2. The RFID tag of claim 1, wherein the antenna is no larger than 40 mm in a maximum dimension.

3. The RFID tag of claim 1, wherein a center of the shielding structure is substantially aligned with the RFID chip.

4. The RFID tag of claim 1, wherein the shielding structure is larger than the gap.

5. The RFID tag of claim 1, wherein the shielding structure is electrically coupled to the antenna through the substrate.

6. The RFID tag of claim 1, wherein the first and second conductive bridges are substantially identical.

7. The RFID tag of claim 1, wherein the first and second conductive bridges are substantially equally spaced from the gap.

8. The RFID tag of claim 1, wherein each of the first and second conductive bridges is positioned closer to an associated edge of the shielding structure than to the gap.

9. The RFID tag of claim 1, wherein each of the first and second conductive bridges comprises an electro-chemically formed via.

10. The RFID tag of claim 1, wherein each of the first and second conductive bridges comprises a crimp.

11. The RFID tag of claim 1, wherein each of the first and second conductive bridges comprises conductive ink received by a respective hole defined in the substrate.

12. A method of manufacturing an RFID tag comprising:
    providing a web comprising a substrate including opposing first and second surfaces, a first conductive layer secured to the first surface, and a second conductive layer secured to the second surface;
    forming at least a portion of the first conductive layer into a dipole antenna defining a gap and configured to operate at a first frequency;
    forming at least a portion of the second conductive layer into a shielding structure, wherein at least a portion of the shielding structure is in substantial alignment with the gap, and the shielding structure is configured to limit the voltage across the gap when the antenna is exposed to a second frequency greater than the first frequency; and
    electrically coupling an RFID chip to the antenna across the gap, and the shielding structure is electrically coupled to the antenna through the substrate, with a first conductive bridge and a second conductive bridge extending between the shielding structure and the antenna, to prevent formation of an arc across the gap.

13. The method of claim 12, wherein said antenna and said shielding structure are formed via die-cutting.

14. The method of claim 12, wherein said antenna and said shielding structure are formed via laser-cutting.

15. The method of claim 14, further comprising reversing an orientation of the web between said forming at least the portion of the first conductive layer into the antenna and said forming at least the portion of the second conductive layer into the shielding structure.

16. The method of claim 14, wherein one of said antenna and said shielding structure is formed during a first pass through a forming system and the other one of said antenna and said shielding structure is formed during a second pass through the forming system.

17. The method of claim 12, wherein said forming at least the portion of the first conductive layer into the antenna and said forming at least the portion of the second conductive layer into the shielding structure occur at least partially simultaneously.

18. The method of claim 12, wherein said forming at least the portion of the first conductive layer into the antenna and said forming at least the portion of the second conductive layer into the shielding structure occur sequentially.

* * * * *